(12) United States Patent
Huebner et al.

(10) Patent No.: US 7,874,277 B2
(45) Date of Patent: Jan. 25, 2011

(54) COMBUSTION METHOD FOR A RECIPROCATING PISTON INTERNAL COMBUSTION ENGINE

(75) Inventors: Walter Huebner, Grasbrunn (DE);
Amin Velji, Karlsruhe (DE); Sebastian Hensel, Winterthur (CH); Christof Schulz, Cologne (DE); Boris Kock, Ratingen (DE); Norbert Peters, Aachen (DE); Olaf Roehl, Aachen (DE); Konstantinos Boulouchos, Zurich (CH); Ulrich Spicher, Herxheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/573,404

(22) Filed: Oct. 5, 2009

(65) Prior Publication Data

US 2010/0083934 A1 Apr. 8, 2010

Related U.S. Application Data

(63) Continuation of application No. PCT/EP2008/002088, filed on Mar. 15, 2008.

(30) Foreign Application Priority Data

Apr. 4, 2007 (DE) .................. 10 2007 016 278

(51) Int. Cl.
*F02B 3/12* (2006.01)
(52) U.S. Cl. ..................................... 123/299; 123/305
(58) Field of Classification Search .................. 123/299, 123/305
See application file for complete search history.

(56) References Cited

U.S. PATENT DOCUMENTS 6,182,632 B1 * 2/2001 Yanagihara .................. 123/299

(Continued)

FOREIGN PATENT DOCUMENTS

DE 198 10 935 A1 9/1999

(Continued)

OTHER PUBLICATIONS

German Search Report dated Mar. 3, 2008 including partial English translation (Nine(9) pages).

(Continued)

*Primary Examiner*—Erick Solis
(74) *Attorney, Agent, or Firm*—Crowell & Moring LLP

(57) ABSTRACT

A reciprocating engine includes a combustion chamber, and a gas exchange inlet valve and a gas exchange outlet valve for a charge cycle. The method introduces an inlet gas into the combustion chamber in an intake phase; introduces a primary quantity of fuel into the combustion chamber during the intake phase and/or a compression phase; compresses the inlet gas and the fuel in the compression phase; ignites a mixture of inlet gas and fuel formed in the combustion chamber; and expands and discharges an exhaust gas formed by the combustion in an expansion phase. A pilot quantity of fuel is introduced into the combustion chamber before the primary quantity of fuel is introduced. Intermediate products of the pilot quantity of fuel are formed and the primary quantity of fuel is introduced into the combustion chamber during the compression phase such that complete ignition of the mixture consisting of inlet gas and the intermediate products is suppressed and other intermediate products are formed until a controlled ignition of the mixture and other intermediate products occurs.

15 Claims, 2 Drawing Sheets

U.S. PATENT DOCUMENTS

| | | | |
|---|---|---|---|
| 6,192,858 B1 | 2/2001 | Nieberding | |
| 6,499,458 B1 | 12/2002 | Nieberding | |
| 6,609,493 B2 * | 8/2003 | Yamaguchi et al. | 123/299 |
| 6,964,256 B2 * | 11/2005 | Kataoka et al. | 123/295 |
| 7,143,739 B2 | 12/2006 | Brachert et al. | |
| 7,222,602 B2 * | 5/2007 | Fukasawa | 123/299 |
| 7,234,438 B2 * | 6/2007 | Yang | 123/295 |
| 7,240,659 B2 * | 7/2007 | Yang | 123/295 |
| 7,263,982 B2 | 9/2007 | Brachert et al. | |
| 7,293,544 B2 | 11/2007 | Brachert et al. | |
| 7,347,179 B2 | 3/2008 | Brachert et al. | |
| 2001/0015192 A1 * | 8/2001 | Urushihara et al. | 123/299 |
| 2003/0192305 A1 | 10/2003 | Iihoshi et al. | |
| 2003/0230276 A1 * | 12/2003 | Kataoka et al. | 123/295 |
| 2004/0149255 A1 * | 8/2004 | zur Loye et al. | 123/295 |
| 2004/0154582 A1 * | 8/2004 | Shimazaki | 123/299 |
| 2006/0130805 A1 | 6/2006 | Juretzka et al. | |

FOREIGN PATENT DOCUMENTS

| | | |
|---|---|---|
| DE | 198 10 935 C2 | 9/1999 |
| DE | 103 44 426 A1 | 4/2005 |
| DE | 103 50 796 A1 | 5/2005 |
| DE | 103 50 797 A1 | 5/2005 |
| DE | 103 50 800 A1 | 5/2005 |
| EP | 1 001 148 A2 | 5/2000 |
| EP | 1 031 711 A2 | 8/2000 |
| EP | 1 496 231 A1 | 1/2005 |
| EP | 1 750 000 A2 | 2/2007 |
| WO | WO 86/04111 A1 | 7/1986 |
| WO | WO 2004/031559 A1 | 4/2004 |

OTHER PUBLICATIONS

International Search Report dated Oct. 8, 2009 including English translation (Six (6) pages).

* cited by examiner

COMBUSTION METHOD FOR A RECIPROCATING PISTON INTERNAL COMBUSTION ENGINE

CROSS-REFERENCE TO RELATED APPLICATIONS

This application is a continuation of PCT International Application No. PCT/EP2008/002088, filed Mar. 15, 2008, which claims priority under 35 U.S.C. §119 to German Patent Application No. 10 2007 016 278.4, filed Apr. 4, 2007, the entire disclosures of which are herein expressly incorporated by reference.

BACKGROUND AND SUMMARY OF THE INVENTION

The invention relates to a combustion method, in particular for a four stroke reciprocating piston internal combustion engine with a combustion chamber, the volume of which can be changed by a reciprocating piston. Fuel can be introduced directly into the combustion chamber. At least one gas exchange inlet valve and one gas exchange outlet valve for a charge cycle is provided. The combustion chamber has a minimal volume at a top dead center of the charge cycle and at the ignition top dead center.

In the case of direct injection internal combustion engines with auto-ignition, the homogeneous lean mixtures of fuel and air often ignite automatically, so that high efficiency and improved exhaust gas emissions are achieved. In such so-called HCCI (homogeneous charge compression ignition) and/or CAI (cold air intake) internal combustion engines, also known as internal combustion engines with chamber ignition combustion, a lean base mixture of air, fuel and retained exhaust gas is usually formed in the lower partial load range and automatically ignited. At higher loads, the auto-ignition also produces a steep rise in the pressure in the combustion chamber, a feature that would have a negative impact on the operation.

DE 198 10 935 C2 discloses, for example, a method for operating an internal combustion engine that operates according to the four stroke principle. In this case, a homogeneous, lean base mixture of air, fuel and retained exhaust gas is formed, and this base mixture is burned following compression ignition.

At the same time, an activation phase is inserted in order to expand the operating range of the engine with compression ignition. During the compression of the retained exhaust gas, a quantity of activation fuel is injected into the combustion chamber and distributed as homogeneously as possible with the other constituents of the mixture in the combustion chamber. In this way thermal energy is introduced into the mixture by way of compression, so that a chemical reaction, that is an ignition in the vicinity of the top dead center of the charge cycle, is introduced. The point of time and the quantity of the activation injection can be used to control the ignition point of the fresh charge during the main combustion process.

In the case of a dynamic operation of the internal combustion engine, that is, in the case of variable rotational speed, it is very difficult with the known combustion method to control with precision the ignition point by means of the point in time and the quantity of the activation injection.

The object of the present invention is to provide a combustion method, in particular for a four stroke reciprocating piston internal combustion engine, with which a very precise control of the ignition point is possible.

This object is achieved with a combustion method which introduces a fresh gas into the combustion chamber in an intake phase; introduces a primary quantity of a fuel into the combustion chamber during the intake phase and/or a compression phase; compresses the fresh gas and fuel in the compression phase; ignites a mixture, which comprises fresh gas and fuel and is formed in the combustion chamber; expands and discharges an exhaust gas, which has formed by the combustion process, in an expansion phase, wherein a pilot quantity of fuel is introduced before the primary quantity of fuel is introduced intermediate products of the pilot quantity of fuel are formed; and the primary quantity of fuel is introduced during the compression phase such that complete ignition of the mixture of the fresh gas and the intermediate products is suppressed, and additional intermediate products are formed, until a controlled ignition of the mixture and the additional intermediate products takes place.

It could be demonstrated numerically that an uncontrolled chain reaction (auto-ignition of the intermediate products of the fuel/air mixture) can be suppressed in a targeted manner by the presence of fuel molecules, thus, delaying the combustion process, and its start can be monitored and controlled. Intermediate products are defined as a fuel that has a higher rate of combustion than the basic fuel. This fuel can be, for example, a mixture comprising fuel, formaldehyde and hydrogen peroxide. One possibility for producing the intermediate products is the so-called cold flame or cold combustion. This chemical process occurs in a temperature range between 700 K and 1,000 K.

At this point, according to the invention, the combustion is delayed for a period of time through the continuous addition of fuel ("subsequent feeding with additional fuel") until the desired ignition point is reached. Thereafter, the combustion can begin in a controlled manner by external ignition or auto-ignition. Then, this combustion process runs very quickly and stably, and the NOx level remains low on account of the very fast and late reaction. In parallel, the result of the high ignition quality of the mixture and/or the high flame propagation rate is a very lean combustion process, which contributes significantly to decreasing the combustion temperatures. The fact that such a combustion sequence of the invention leads to very low NOx emissions is documented by the results obtained from a lean combustion process with explosive fuels, like hydrogen or reformer gas. In the latter case, for example, $H_2$ enriched gas is admixed to the gasoline. However, in principle the combustion method of the invention can be used for almost any kind of fuel, such as gasoline, diesel, etc. In order to produce intermediate products, it is necessary to use a fuel that is characterized by a distinct low temperature kinetic behavior. This is the case with the higher hydrocarbons, for which reason fuels, such as ethanol or natural gas, are not really suited for the method, according to the invention.

Preferably, the intermediate products are formed by an undercut of the gas exchange valves during the top dead center phase of the charge cycle (LOT phase), since then in the compression phase the intermediate products are present in a very homogenous state in the combustion chamber.

According to further aspects of the invention, the ignition can occur either by way of an external ignition, such as with a spark plug, or by stopping the injection of additional fuel, with subsequent auto-ignition.

According to a further aspect of the invention, it is possible to decrease the emission even more by mixing the fresh gas at least partially with exhaust gas. In this case it concerns, for example, an external exhaust gas recirculation.

In addition to a stoichiometric operation of the internal combustion engine, a lean operation is also possible. To this end, the exhaust gas in the combustion chamber is formed at least partially with a high excess of oxygen.

Other objects, advantages and novel features of the present invention will become apparent from the following detailed description of one or more preferred embodiments when considered in conjunction with the accompanying drawings explaining two operating modes.

DETAILED DESCRIPTION OF THE DRAWINGS

Figure 1:
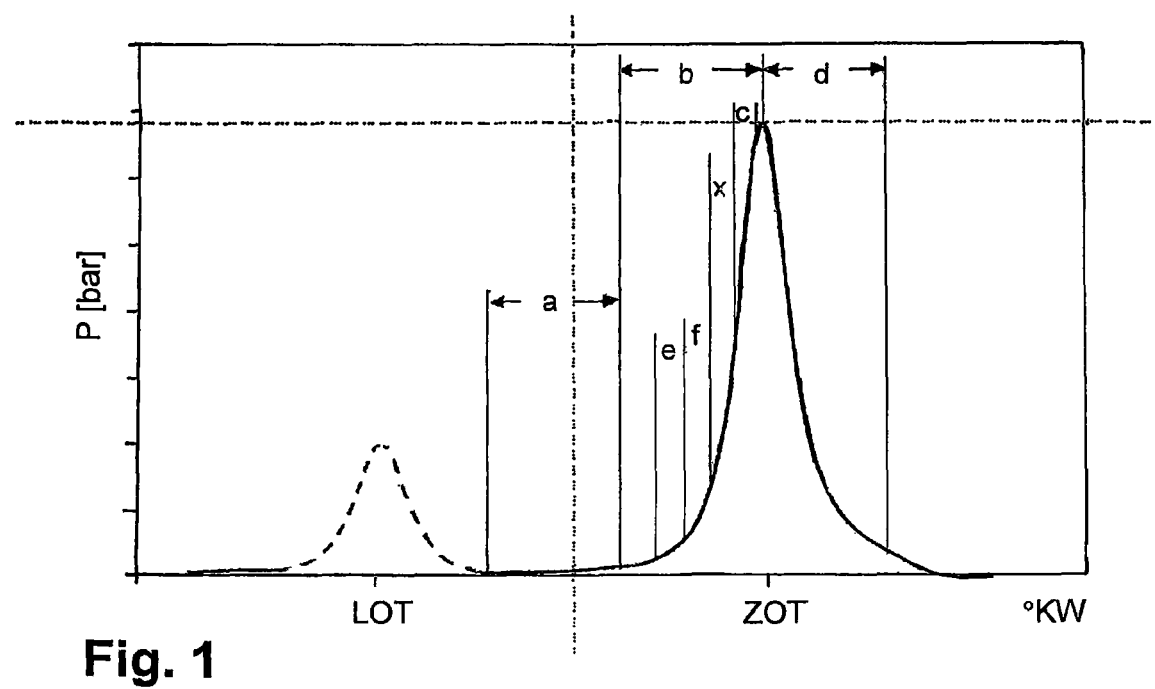
FIG. 1 graphs an internal cylinder pressure curve for a first operating mode of an internal combustion engine operated according to the invention.

FIG. 1 shows an internal cylinder pressure curve for a four stroke reciprocating piston internal combustion engine in a first operating mode. It is a schematic drawing of an internal cylinder pressure curve 1 plotted over a 720° crankshaft. An internal cylinder pressure of the internal combustion engine is plotted on the Y axis, and the 720° crankshaft is plotted on the X axis. The first pressure rise, which is represented by the dashed line and which is formed by a gas exchange valve undercut, corresponds to a top dead center of the charge cycle (LOT) of a piston, the second pressure rise, when viewed in the direction of the X axis, corresponds to the ignition top dead center (ZOT) of the piston.

In an additional operating mode of the internal combustion engine, the first pressure rise can also cease to exist, for example, due to a gas exchange valve overlap.

In the case of a gas exchange valve undercut, the gas exchange inlet valves and gas exchange outlet valves are closed when the piston is positioned in the vicinity of the LOT. In the case of a gas exchange valve overlap, the gas exchange inlet valves and the gas exchange outlet valves are open when the piston is positioned in the vicinity of the LOT.

The combustion method of the invention is intended for the four stroke reciprocating piston internal combustion engine with a combustion chamber, the volume of which can be changed by a reciprocating piston which performs a lifting movement. In this context, a fuel, such as gasoline, diesel, etc., can be introduced (can be injected or sprayed-in) directly into the combustion chamber. Preferably, the fuel ought to contain carbon atoms and/or include hydrocarbons. The internal combustion engine has at least one gas exchange inlet valve and one gas exchange outlet valve for a charge exchange, and the combustion chamber has a minimal value at the top dead center of the charge cycle (LOT) and at the ignition top dead center (ZOT), respectively. The combustion method exhibits the following process steps:

(1) introducing a fresh gas into the combustion chamber in an intake phase (a);

(2) introducing a primary quantity of a fuel (x) into the combustion chamber during the intake phase (a) and/or a compression phase (b);

(3) compressing the fresh gas and fuel in the compression phase (b);

(4) igniting a mixture, which comprises fresh gas and fuel and is formed in the combustion chamber (c);

(5) expanding and discharging an exhaust gas, which has formed by the combustion process, in an expansion phase (d), wherein (6) a pilot quantity of fuel (e) is introduced into the combustion chamber before the primary quantity of fuel (x) is introduced;

(7) intermediate products of the pilot quantity of fuel are formed (f) (activation), and the primary quantity of fuel (x) is introduced into the combustion chamber during the compression phase (b) in such a way that the complete ignition of the mixture consisting of the fresh gas and the intermediate products is suppressed, and additional intermediate products, which do not have to be necessarily identical to those derived from the activation phase, are formed, until a controlled ignition of the mixture and the additional intermediate products takes place (c).

Intermediate products are defined as a fuel that has, for example, a higher rate of combustion than the basic fuel. It can be, for example, a mixture of fuel, partially oxidized hydrocarbons, formaldehyde and hydrogen peroxide. One possibility for producing the intermediate products is the so-called cold flame or cold combustion process. This chemical process occurs in a temperature range between 700 K and 1,000 K.

In this context, the combustion chamber is defined as the chamber, which includes the swept volume and the compression volume, where the volumes are formed by an inside of the cylinder head, a piston bottom, and a cylinder.

Figure 2:
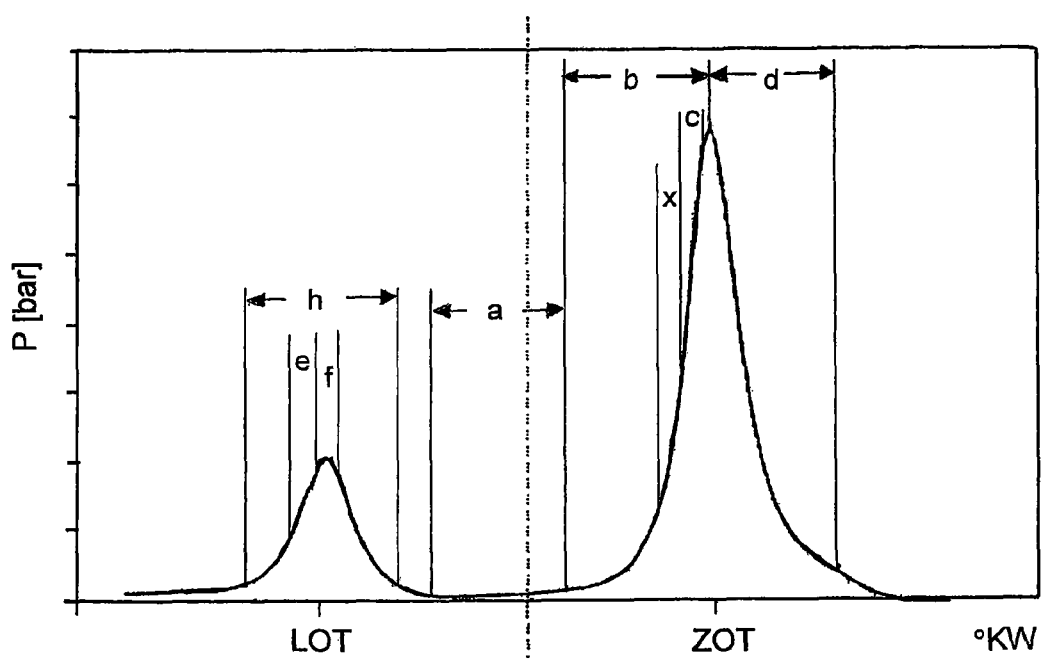
FIG. 2 graphs an internal cylinder pressure curve for a second operating mode of an internal combustion engine operated according to the invention.

FIG. 2 shows an internal cylinder pressure curve for a four stroke reciprocating piston internal combustion engine in a second operating mode. The basic four stroke operating mode of the reciprocating piston internal combustion engine corresponds to that shown in FIG. 1. At variance with the first operating mode, in the second operating mode the first fuel is introduced into the combustion chamber as early as in the LOT phase (h). In the vicinity of the LOT, temperatures ranging from 700 K to 1,000 K are reached in the combustion chamber in this second operating mode. In this second operating mode, the intermediate products are present in an especially homogeneous state in the combustion chamber in the subsequent compression phase (b).

According to this embodiment of the invention, even in this second operating mode additional fuel is injected into the combustion chamber during the compression before the ZOT (x), so that the complete ignition of the mixture consisting of fresh gas and the intermediate products, which were formed during the LOT phase (h) (activation), is suppressed, and additional intermediate products are formed from the primary quantity of the fuel, introduced into the combustion chamber, until a controlled (external or auto) ignition of the mixture and the additional intermediate products takes place (c).

Besides a four stroke reciprocating piston internal combustion engine, it is also possible to operate, for example, a six stroke reciprocating piston internal combustion engine in accordance with the invention.

Figure 3A:
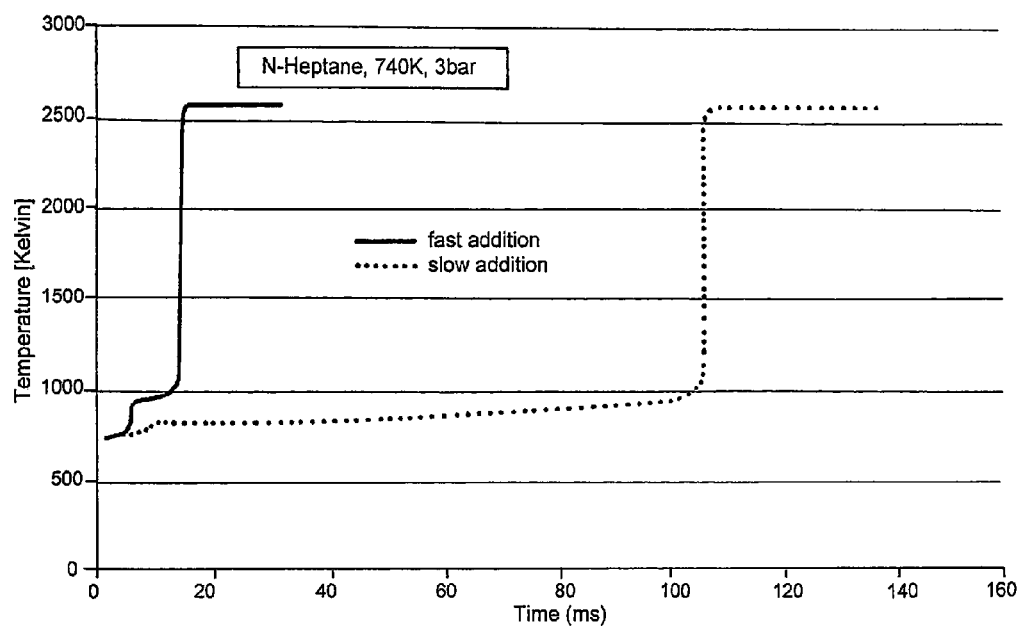
FIGS. 3a and 3b graph numerically calculated temperature and lambda curves (air to fuel ratio) for an addition of fuel as described according to the invention ("subsequent feeding with additional fuel").
Figure 3B:
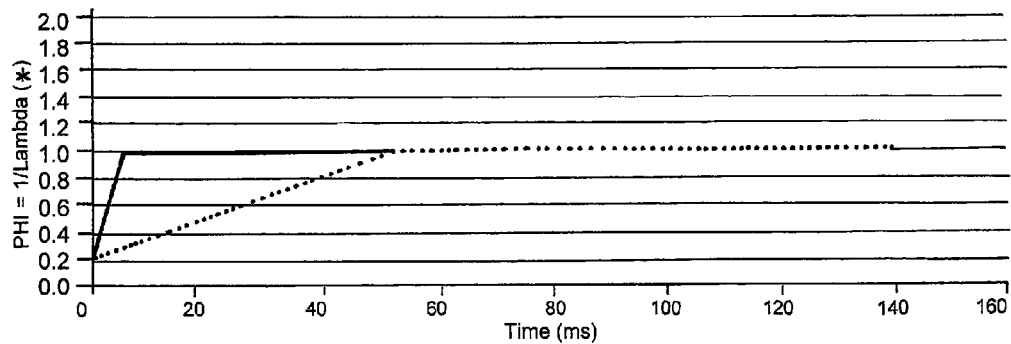

FIGS. 3a and 3b are diagrams of the simulation results with respect to the influence of a continuous addition of fuel on the combustion start. On the one hand, the temperature in degrees Kelvin (FIG. 3a) and, on the other hand, the air-to-fuel ratio (FIG. 3b) are plotted on the Y axis; on the X axis the time is plotted in milliseconds (FIGS. 3a and 3b). During the first temperature increase to approximately 900 K, the intermediate products are formed. They show a tendency to undergo a fast second conversion (main combustion), but an additional addition of fuel can delay the combustion start. As long as fuel is added, the main conversion (temperature rise to above 2,500 K) is suppressed.

Preferably the intermediate products are formed, according to the second combustion method, by an undercut of the gas exchange valves during the charge cycle top dead center phase. Furthermore, the primary quantity of fuel is injected or blown into the combustion chamber preferably during the introduction of fresh gas. In a first alternative, the ignition of the mixture in the combustion chamber takes place by an external ignition, for example, with an ignition device such as a spark plug. In another alternative, the ignition of the mixture can take place by stopping the injection of the primary quantity of fuel. In order to reduce even more the emission of exhaust gas, the fresh gas can be mixed in an advantageous manner at least partially with exhaust gas. Furthermore, the combustion method of the invention allows a lean engine operation, which means that the exhaust gas in the combustion chamber is formed at least partially with an excess of oxygen.

It is known that in order to increase the ignition quality a mixture is pre-conditioned (for example, by pressure, temperature, mixture composition). This strategy enhances in a desired way the auto-ignition tendency, and, thus, the results are corresponding chain reactions, which introduce the combustion. However, in the case of the combustion methods known in the prior art, like HCCI or stratified layer combustion processes, this chain reaction occurs in an uncontrolled manner, and, as a result, there are limits with respect to enhancing the ignition performance. Here, it could be demonstrated numerically that this uncontrolled chain reaction (auto-ignition) can be suppressed in a targeted manner by the presence of fuel molecules, and in this way the combustion can be delayed, and its start can be monitored and controlled. Advantageously, the combustion method delays the combustion process by a continuous addition of fuel ("subsequent feeding" of fuel) until the desired ignition point is reached. Thereafter, the combustion process can start in a controlled manner (by external ignition or auto-ignition), which then runs very quickly, and the NOx level remains low because of the very fast and late reaction. In parallel, the result of the high ignition quality of the mixture is a very lean combustion process, a state that significantly decreases combustion temperatures. The fact that such a combustion method leads to very low NOx emissions is documented by the results obtained from a lean combustion process using explosive fuels, like hydrogen or reformer gas. The combustion method thus solves the target conflict—fuel consumption versus NOx emissions in the lean combustion process (Otto and diesel)— and, thus, compliance with future emission regulations without having to suffer a setback in fuel consumption. Furthermore, it concerns a lean combustion method that can be used worldwide. The combustion method significantly reduces the complexity and the cost of a post-treatment of the exhaust gas.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of combustion in a reciprocating piston internal combustion engine having a combustion chamber, a volume of which is changeable via a reciprocating piston and fuel being introduceable directly into the combustion chamber, the engine further having a gas exchange inlet valve and a gas exchange outlet valve for a charge cycle, the combustion chamber having a minimum volume at a top dead center position of the charge cycle and at an ignition top dead center, the method comprising the acts of:
   introducing a fresh gas into the combustion chamber in an intake phase;
   introducing a primary quantity of fuel into the combustion chamber during at least one of the intake phase and a compression phase;
   compressing the fresh gas and the fuel in the compression phase;
   igniting a mixture comprising the fresh gas and the fuel formed in the combustion chamber;
   expanding and discharging an exhaust gas formed by combustion in an expansion phase;
   wherein:
      a pilot quantity of fuel is introduced before the primary quantity of fuel is introduced;
      intermediate products of the pilot quantity of fuel are formed; and
      the primary quantity of fuel is introduced during the compression phase such that complete ignition of the mixture comprising the fresh gas and the intermediate products is suppressed, and additional intermediate products are formed, until a controlled ignition of the mixture and the additional intermediate products occurs.

2. The method according to claim 1, wherein after the expansion phase, a pressure and a temperature rise in the combustion chamber is produced by an undercut of the inlet and outlet valves during the top dead center phase of the charge cycle.

3. The method according to claim 2, wherein the pilot quantity of fuel is introduced into the combustion chamber before the top dead center phase of the charge cycle, and wherein formation of the intermediate products occurs during the top dead center phase of the charge cycle.

4. The method according to claim 1, wherein the act of igniting the mixture occurs via an external ignition.

5. The method according to claim 2, wherein the act of igniting the mixture occurs via an external ignition.

6. The method according to claim 3, wherein the act of igniting the mixture occurs via an external ignition.

7. The method of claim 1, wherein the act of igniting the mixture occurs via an external ignition.

8. The method according to claim 2, where the act of igniting the mixture occurs by stopping additional fuel from being injected.

9. The method according to claim 3, where the act of igniting the mixture occurs by stopping additional fuel from being injected.

10. The method according to claim 1, wherein the fresh gas is mixed at least partially with exhaust gas.

11. The method according to claim 2, wherein the fresh gas is mixed at least partially with exhaust gas.

12. The method according to claim 3, wherein the fresh gas is mixed at least partially with exhaust gas.

13. The method according to claim 1, wherein the exhaust gas formed by the combustion in the combustion chamber has an excess of oxygen.

14. The method according to claim 2, where the exhaust gas formed by the combustion in the combustion chamber has an excess of oxygen.

15. The method according to claim 3, where the exhaust gas formed by the combustion in the combustion chamber has an excess of oxygen.

* * * * *